United States Patent
Chakra et al.

(10) Patent No.: US 8,849,760 B2
(45) Date of Patent: Sep. 30, 2014

(54) DETERMINING WHETHER PREDEFINED DATA CONTROLLED BY A SERVER IS REPLICATED TO A CLIENT MACHINE

(75) Inventors: Al Chakra, Cary, NC (US); David Kaminsky, Chapel Hill, NC (US); David M. Ogle, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 852 days.

(21) Appl. No.: 11/415,674

(22) Filed: May 2, 2006

(65) Prior Publication Data

US 2007/0260649 A1 Nov. 8, 2007

(51) Int. Cl.
*G06F 17/30* (2006.01)
*H04L 29/06* (2006.01)

(52) U.S. Cl.
CPC .............. *H04L 63/10* (2013.01); *H04L 63/107* (2013.01)
USPC ............................ 707/640; 707/641; 707/644

(58) Field of Classification Search
USPC ............................ 707/204, 640, 641; 709/229
See application file for complete search history.

(56) References Cited

U.S. PATENT DOCUMENTS

| 5,893,116 | A | 4/1999 | Simmonds et al. |
| 6,574,617 | B1 | 6/2003 | Immerman et al. |
| 6,684,250 | B2 | 1/2004 | Anderson et al. |
| 6,732,175 | B1 | 5/2004 | Abjanic |
| 6,757,740 | B1 | 6/2004 | Parekh et al. |
| 6,804,624 | B2 * | 10/2004 | Silverman .................... 702/159 |
| 7,000,015 | B2 | 2/2006 | Moore et al. |
| 7,219,120 | B2 * | 5/2007 | Hui ............................. 709/225 |
| 2002/0069366 | A1 * | 6/2002 | Schoettger .................. 713/201 |
| 2002/0138632 | A1 * | 9/2002 | Bade et al. .................. 709/229 |
| 2002/0166063 | A1 * | 11/2002 | Lachman et al. ............ 713/200 |
| 2003/0041238 | A1 | 2/2003 | French et al. |
| 2003/0046022 | A1 | 3/2003 | Silverman |
| 2003/0093438 | A1 | 5/2003 | Miller |
| 2003/0097597 | A1 | 5/2003 | Lewis |
| 2003/0135644 | A1 | 7/2003 | Barrett |
| 2004/0078490 | A1 | 4/2004 | Anderson et al. |
| 2004/0172531 | A1 | 9/2004 | Little et al. |
| 2004/0199623 | A1 * | 10/2004 | Houri .......................... 709/223 |
| 2005/0021738 | A1 * | 1/2005 | Goeller et al. .............. 709/224 |

(Continued)

FOREIGN PATENT DOCUMENTS

| EP | 1443423 A1 | 8/2004 |
| JP | 11234270 A | 8/1999 |

OTHER PUBLICATIONS

Cedric Blancher, About Good Usage of Traceroute, Sep.-Oct. 2003, Issue #9, pp. 62-65.*

(Continued)

*Primary Examiner* — Shyue Jiunn Hwa
(74) *Attorney, Agent, or Firm* — Stevens & Showalter, LLP

(57) ABSTRACT

A request is received for predefined data from a client machine. It is determined if the client machine is at an acceptable location to receive the predefined data. The requested predefined data is replicated to the client machine if the client machine is at an acceptable location and replication of the predefined data is prevented if the client machine is at an unacceptable location.

11 Claims, 7 Drawing Sheets

(56) References Cited

U.S. PATENT DOCUMENTS

| | | | |
|---|---|---|---|
| 2005/0021740 A1* | 1/2005 | Bar et al. | 709/224 |
| 2005/0138158 A1* | 6/2005 | Challener et al. | 709/223 |
| 2005/0138204 A1 | 6/2005 | Iyer et al. | |
| 2005/0152318 A1* | 7/2005 | Elbatt et al. | 370/338 |
| 2006/0209852 A1* | 9/2006 | Wakumoto et al. | 370/401 |
| 2007/0079307 A1* | 4/2007 | Dhawan et al. | 718/1 |
| 2007/0220607 A1* | 9/2007 | Sprosts et al. | 726/24 |

OTHER PUBLICATIONS

Padmanabhan et al, Secure Traceroute to Detect Faulty or Malicious Routing, 2002 (http://research.microsoft.com/en-us/um/people/padmanab/papers/hotnets2002.ps.*

Padmanabhan Venkata and Simon Daniel, Secure traceroute to detect faulty or malicious routing, Jan. 2003, ACM, vol. 33, Issue 1, pp. 1-6.*

\* cited by examiner

| | | | |
|---|---|---|---|
| 1 | 47 ms | 57 ms | 45 ms p7.www.mud.yahoo.com [68.142.197.70] |
| 2 | 43 ms | 55 ms | 43 ms ten-8-1.bas2.mud.yahoo.com [68.142.193.27] |
| 3 | 45 ms | 44 ms | 43 ms UNKNOWN-216-115-104-99.yahoo.com [216.115.104.99] |
| 4 | 43 ms | 43 ms | 57 ms ix-6-0.core1.DTX-Dallas.teleglobe.net [216.6.53.6] |
| 5 | 47 ms | 211 ms | 33 ms if-0-1.core1.A56-Atlanta.Teleglobe.net [64.86.8.5] |
| 6 | 21 ms | 22 ms | 22 ms if-8-0.har1.A56-Atlanta.teleglobe.net [64.86.9.1] |
| 7 | 20 ms | 19 ms | 30 ms pop1-atm-P4-0.atdn.net [66.185.150.1] |
| 8 | 20 ms | 19 ms | 21 ms bb1-atm-P6-0.atdn.net [66.185.152.182] |
| 9 | 16 ms | 27 ms | 15 ms bb1-cha-P3-0.atdn.net [66.185.138.64] |
| 10 | 16 ms | 16 ms | 19 ms pop1-cha-P4-0.atdn.net [66.185.132.45] |
| 11 | 16 ms | 17 ms | 15 ms son0-1-1.chrlncsa-rtr6.carolina.rr.com [24.93.64.57] |
| 12 | 10 ms | 10 ms | 19 ms pos14-0.rlghncrdc-rtr2.nc.rr.com [24.25.0.9] |
| 13 | 10 ms | 9 ms | 11 ms pos1-1.rlghnca-rtr2.nc.rr.com [24.25.20.25] |
| 14 | 10 ms | 8 ms | 9 ms srp5-0.rlghncg-rtr2.nc.rr.com [24.25.2.147] |
| 15 | 16 ms | 7 ms | 9 ms gig2-2.rlghncj-rtr2.nc.rr.com [24.25.1.45] |
| 16 | 10 ms | 8 ms | 22 ms 10.42.64.1 |
| 17 | 1 ms | 1 ms | 1 ms 192.168.1.1 |

FIG. 3

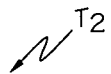

| | | | |
|---|---|---|---|
| 1 | 67 ms | 64 ms | 63 ms www-lvs0.net.ohio-state.edu [128.146.216.50] |
| 2 | 61 ms | 60 ms | 65 ms kc6-gig3-1.net.ohio-state.edu [164.107.2.142] |
| 3 | 63 ms | 63 ms | 63 ms kc2-gig1-3-0.ohio-dmz.net [199.18.22.2] |
| 4 | 64 ms | 74 ms | 60 ms clmbo-r0-ge-1-0-0s303.bb.oar.net [199.18.152.49] |
| 5 | 59 ms | 60 ms | 63 ms 65.115.40.30 |
| 6 | 34 ms | 42 ms | 33 ms jfk-edge-20.inet.qwest.net [205.171.230.17] |
| 7 | * | * | * Request timed out. |
| 8 | 22 ms | 40 ms | 22 ms atl-core02.inet.qwest.net [205.171.21.170] |
| 9 | 22 ms | 19 ms | 32 ms atl-brdr-04.inet.qwest.net [65.112.33.129] |
| 10 | 20 ms | 34 ms | 19 ms pop1-atm-P4-0.atdn.net [66.185.150.1] |
| 11 | 20 ms | 21 ms | 20 ms bb1-atm-P6-0.atdn.net [66.185.152.182] |
| 12 | 17 ms | 16 ms | 14 ms bb1-cha-P3-0.atdn.net [66.185.138.64] |
| 13 | 15 ms | 26 ms | 16 ms pop1-cha-P4-0.atdn.riet [66.185.132.45] |
| 14 | 18 ms | 15 ms | 16 ms son1-0-1.chrlncsa-rtr6.carolina.rr.com [24.93.64.81] |
| 15 | 13 ms | 11 ms | 20 ms pos14-0.rlghncrdc-rtr2.nc.rr.com [24.25.0.9] |
| 16 | 10 ms | 12 ms | 10 ms pos1-1.rlghnca-rtr2.nc.rr.com [24.25.20.25] |
| 17 | 10 ms | 13 ms | 9 ms srp5-0.rlghncg-rtr2.nc.rr.com [24.25.2.147] |
| 18 | 18 ms | 8 ms | 9 ms gig2-2.rlghncj-rtr2.nc.rr.com [24.25.1.45] |
| 19 | 10 ms | 17 ms | 9 ms 10.42.64.1 |
| 20 | 2 ms | 1 ms | 1 ms 192.168.1.1 |

FIG. 5

DETERMINING WHETHER PREDEFINED DATA CONTROLLED BY A SERVER IS REPLICATED TO A CLIENT MACHINE

BACKGROUND OF THE INVENTION

Securing sensitive information, such as financial, manufacturing, research and development, product, customer, sales and pricing information, etc., is an important goal for businesses. Employees typically access sensitive information while working in an office located in a secured building owned by an employer. Employees may need to access sensitive information when away from the office, such as when traveling on business or otherwise or working from home. If sensitive information is transferred from a company server to a client machine when the employee is located outside a secured company building, there is risk that the sensitive information may be lost, reviewed by a non-employee or otherwise compromised. For example, the client machine may be lost or stolen.

BRIEF SUMMARY OF THE INVENTION

The present invention provides a method, computer program product and a data processing system for determining whether predefined data is replicated to a client machine. A request is received for predefined data from the client machine. It is determined if the client machine is at an acceptable location, i.e., a secure location, to receive the predefined data. The requested predefined data is replicated to the client machine if the client machine is at an acceptable location and replication of the predefined data is prevented if the client machine is at an unacceptable location.

BRIEF DESCRIPTION OF THE SEVERAL VIEWS OF THE DRAWINGS

FIG. 3 is an example traceroute;

FIG. 5 is an example traceroute;

DETAILED DESCRIPTION OF THE INVENTION

Figure 1:
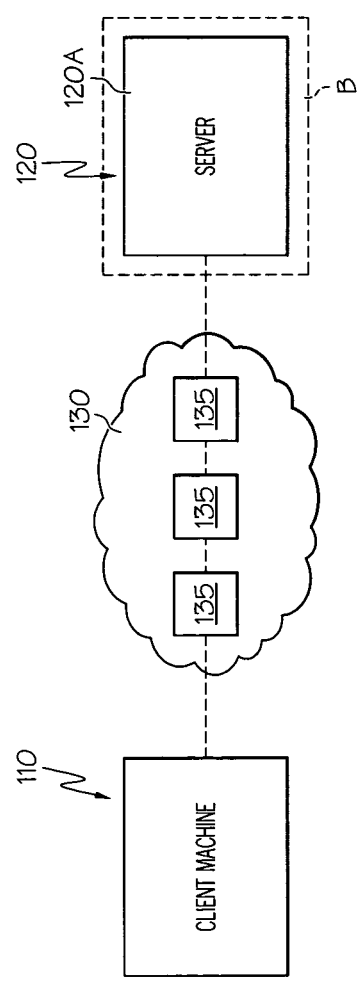
FIG. 1 depicts a pictorial representation of a client machine, a server, and a network defined by hosts.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to the figures, FIG. 1 depicts a pictorial representation of a client machine 110, a server 120 (also referred to herein as a system), and a network such as the Internet 130 defined by one or more hosts 135. The client machine 110 may comprise a computer, such as a personal computer or laptop, having a web browser, or a wireless device such as a personal digital assistant (PDA) or wireless (or cellular) telephone. The wireless connection to the Internet 130 may be effected via infrared, optical or radio connection. The client machine 110 may run file transfer protocol client software. The server 120 may comprise a server computer 120A running, for example, file transfer protocol server software, and storing data. The client machine 110 may initiate a connection with the server 120 and, once connected, may request data from the server 120. Data may include text documents, drawings, photographs and the like. It is contemplated that the server 120 may alternatively comprise a plurality of server computers coupled to one another.

In the illustrated embodiment, the server 120 is owned by Company A and is physically located within a building B owned and controlled by Company A, see FIG. 1. Hence, Company A is able to maintain the server 120 and the data stored within the server 120 secure. Company A may comprise any for-profit or non-profit organization including corporations, hospitals, governments and universities having one or more employees.

In the illustrated embodiment, at least a portion of the data stored and controlled by the server 120 may contain "sensitive information." "Sensitive information" may comprise information the company wishes to maintain confidential, such as financial, manufacturing, research and development, product, customer, sales, and/or pricing information. "Sensitive information" may also include medical, academic, and/or tax records/information. The portion of data containing sensitive information is also referred to herein as "predefined data."

Employees typically access data including sensitive information while working in offices located in buildings owned and controlled by Company A, such as building B, see FIG. 1. However, an employee may need to access data containing sensitive information when traveling on business or otherwise or working from home. In FIG. 1, the client machine 110 is shown located away from property owned and controlled by Company A. While working away from the office, the employee having control over the client machine 110 may wish to download data containing sensitive information to the client machine 110. However, for security reasons, Company A may wish to prevent replication, i.e., downloading, of data containing sensitive information to the client machine 110 if the machine 110 is located in an undesirable or unacceptable geographic location. For example, Company A may determine that documents containing sensitive information should not be downloaded to the client machine 110 if the machine 110 is located at an airport. However, Company A may allow documents containing sensitive information to be downloaded to the client machine 110 when the machine 110 is located at the home of the employee to which the machine 110 is assigned.

Figure 2:
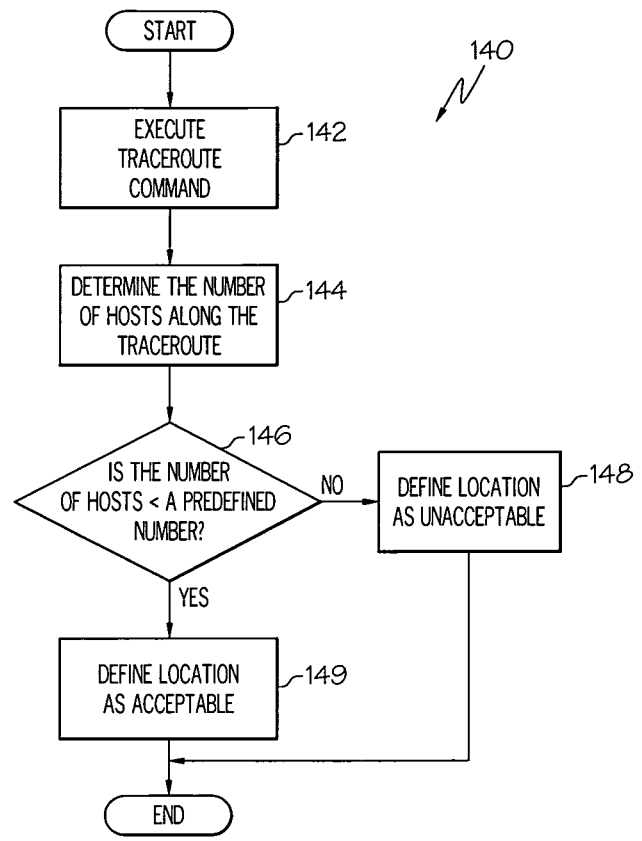
FIG. 2 is a flowchart which defines an algorithm used by a server in accordance with a first embodiment of the present invention to determine if a client machine is located at an acceptable location.

With reference now to FIG. 2, a flowchart 140 is provided which defines an algorithm used by the server 120 in accordance with a first embodiment of the present invention to determine if the client machine 110 is located at an acceptable location.

In step 142, the server 120, in response to receiving a request from the client machine 110 for data including sensitive information, executes a TCP/IP network traceroute command in order to determine the route that information packets take when traveling from the server 120 over the Internet 130 to the client machine 110. As is well-known in the prior art, a document sent from the server 120 to the client machine 110 may be sent in the form of a plurality of information packets. The information packets, when traveling from the server 120 to the client machine 110, travel across one or more networks. A host 135, such as a router, server, or a like device, is provide between each pair of networks along the route and functions to transfer information packets between the pair of networks, see FIG. 1. A traceroute defines the hosts 135 that the information packets may traverse when traveling from the server 120 to the client machine 110. An example traceroute $T_1$ from a server at Yahoo.com to a client machine having an IP address 192.168.1.1 is illustrated in FIG. 3.

In step 144, the server 120 determines the number of hosts 135 that information packets may traverse when traveling from the server 120 to the client machine 110. In step 146, the server 142 determines if the number of hosts in the traceroute, including the initial server and the client machine, is less than a predefined number, e.g., 20 hosts. If so, the server 120 determines that the client machine 110 is at an acceptable location, see step 149. In the example traceroute $T_1$ shown in FIG. 3, the number of hosts is equal to 17, including the server at Yahoo.com and the client machine at address 192.168.1.1. Since the number of hosts in the example traceroute $T_1$ is less than 20, requested data containing sensitive information is downloaded by the server 120 to the client machine 110. If, however, the server 142 determines that the number of hosts is not less than the predefined number, then the server 142 defines the location as being unacceptable, see step 148, and does not download requested data containing sensitive information to the client machine 110.

Figure 4:
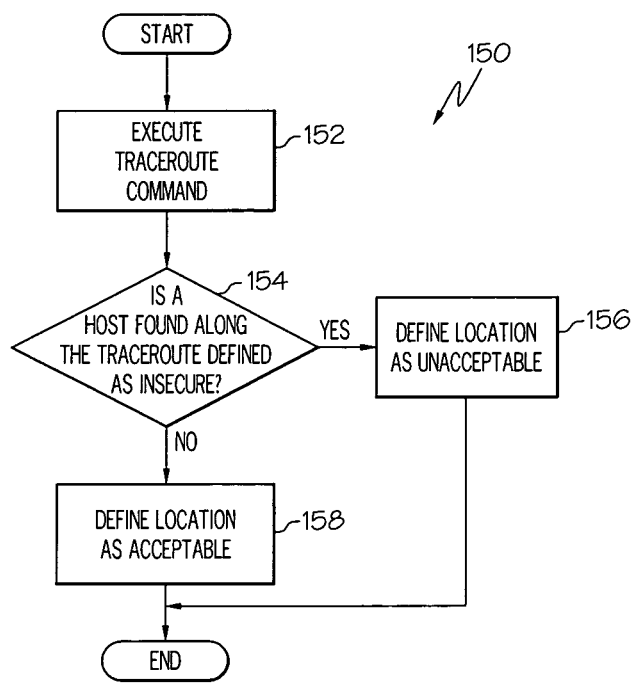
FIG. 4 is a flowchart which defines an algorithm used by a server in accordance with a second embodiment of the present invention to determine if a client machine is located at an acceptable location.

With reference now to FIG. 4, a flowchart 150 is provided which defines an algorithm used by the server 120 in accordance with a second embodiment of the present invention to determine if the client machine 110 is located at an acceptable location.

In step 152, the server 120, in response to receiving a request from the client machine 110 for data including sensitive information, executes a TCP/IP network traceroute command in order to determine the route that information packets take when traveling from the server 120 over the Internet 130 to the client machine 110. The server 120 stores a list identifying hosts predefined as being insecure and which may be located along possible routes between the server 120 and the client machine 110. A host 135 may be identified by its IP address or a fully qualified domain name mapped to that IP address by a domain name server. Each insecure host set out on the list of insecure hosts may be defined in terms of its IP address, its fully qualified domain name or any portion of its fully qualified domain name, e.g., a host name or a domain name.

In step 154, the server 120 determines if any of the hosts 135 found along the traceroute is set out on the list of hosts defined as being insecure. If so, the location of the client machine 110 is found to be unacceptable, see step 156. If none of the hosts 135 along the traceroute are found on the list of hosts defined as being insecure, the server 120 determines that the client machine 110 is at an acceptable location, see step 158.

For purposes of illustration, it is presumed that any IP address having a corresponding domain name "oar.net" is insecure and, hence, is placed on a list of hosts defined as being insecure. Further, the list of hosts defined as being insecure may include any host identified by a row of three asterisks and no associated IP address. Three asterisks and no associated IP address may correspond to a host not responding to a traceroute query. In an example traceroute $T_2$ set out in FIG. 5, host number 4 has a domain name of "oar.net." Because the domain name "oar.net" is found on the list of hosts defined as being insecure in the illustrated example, the server 120 does not download a requested document to the client machine 110. It is also noted that host number 7 is defined by three asterisks and no associated IP address in the traceroute $T_2$ set out in FIG. 5. Hence, for this additional reason, the server 120 does not download a requested document to the client machine 110.

Figure 6:
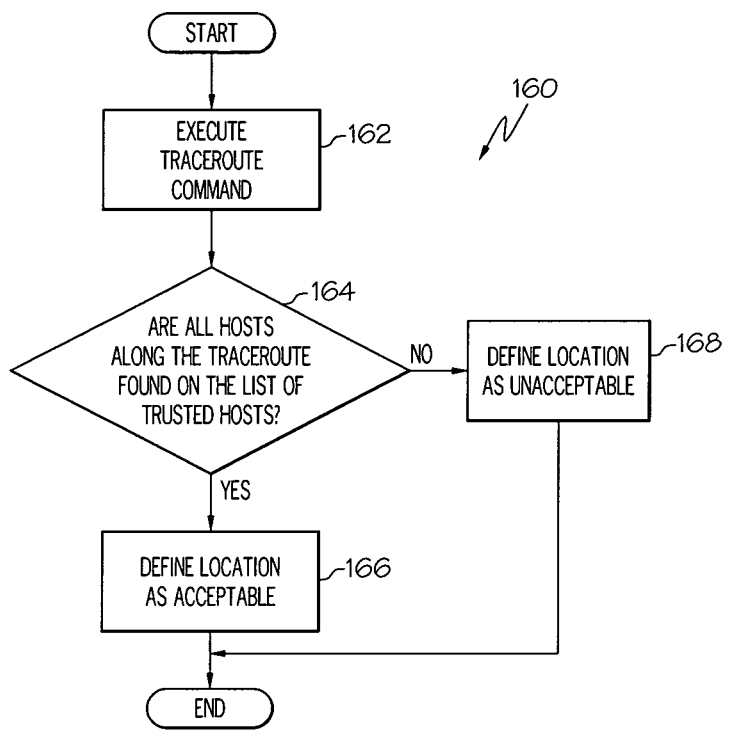
FIG. 6 is a flowchart which defines an algorithm used by a server in accordance with a third embodiment of the present invention to determine if a client machine is located at an acceptable location.

With reference now to FIG. 6, a flowchart 160 is provided which defines an algorithm used by the server 120 in accordance with a third embodiment of the present invention to determine if the client machine 110 is located at an acceptable location.

In step 162, the server 120, in response to receiving a request from the client machine 110 for data including sensitive information, executes a TCP/IP network traceroute command in order to determine the route that information packets take when traveling from the server 120 over the Internet 130 to the client machine 110. The server 120 stores a list identifying hosts predefined as being trusted or safe and which may be located along possible routes between the server 120 and the client machine 110. Each host set out on the list of trusted hosts may be defined in terms of its IP address, its fully qualified domain name or any portion of its fully qualified domain name, e.g., a host name or a domain name.

In step 164, the server 120 determines if all of the hosts 135 found along the traceroute are found on the list of hosts defined as being trusted hosts. If so, the location of the client machine 110 is found to be acceptable, see step 166. If a single host 135 along the traceroute is not found on the list of hosts defined as being trusted, the server 120 determines that the client machine 110 is at an unacceptable location, see step 168.

For example, a list of trusted hosts could include all of the hosts found in the traceroute $T_2$, except for the host having the domain name "oar.net." Hence, in this example, since host number 4 is not found on the list of trusted hosts, the server 120 does not download a requested document to the client machine 110.

Figure 7:
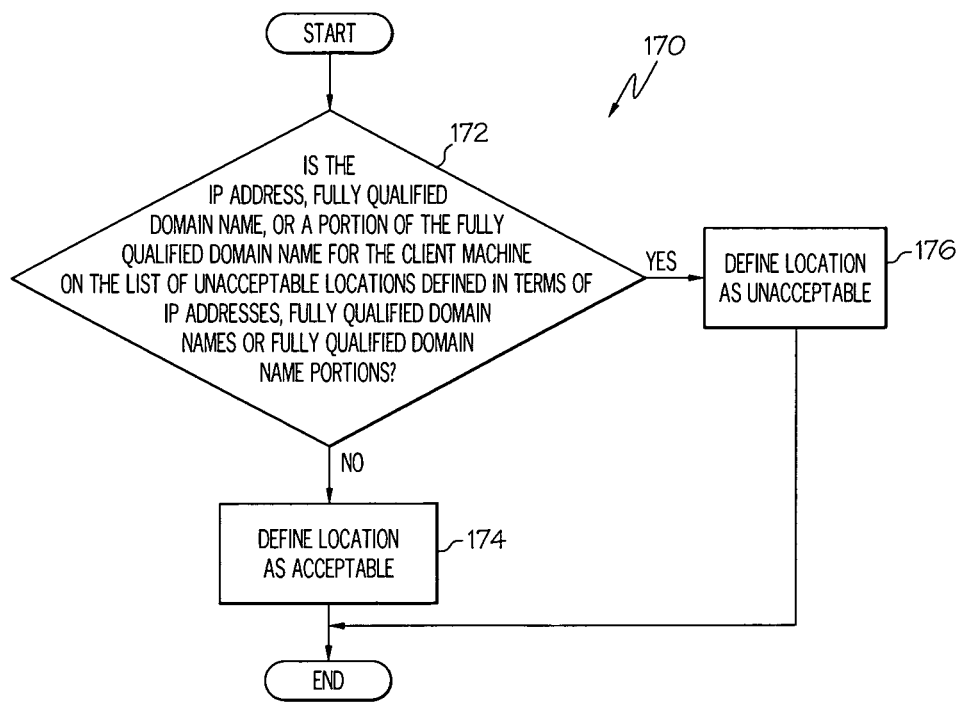
FIG. 7 is a flowchart which defines an algorithm used by a server in accordance with a fourth embodiment of the present invention to determine if a client machine is located at an acceptable location.

With reference now to FIG. 7, a flowchart 170 is provided which defines an algorithm used by the server 120 in accordance with a fourth embodiment of the present invention to determine if the client machine 110 is located at an acceptable location.

The server 120 stores a list identifying an IP address, a fully qualified domain name or any portion of a fully qualified domain name corresponding to each insecure or unacceptable location. In step 172, the server 120, in response to receiving a request from the client machine 110 for data including sensitive information, determines if the IP address, fully qualified domain name or pertinent portion of the fully qualified domain name assigned to the client machine 110 is on a list of unacceptable locations defined in terms of IP addresses, fully qualified domain names or fully qualified domain name portions. If the list is defined in terms of a fully qualified domain name or a portion of a fully qualified domain name, the server 120 may take the IP address it receives for the client machine 110 and query name servers for the fully qualified domain name or a portion of the fully qualified domain name. For example, a list of unacceptable locations may be defined by corresponding domain names including ".iq". Hence, no data containing sensitive information would be downloaded by the server 120 to a client machine 110 having a domain name including ".iq". It is also contemplated that a list may indicate that all IP addresses not including a "9" in the first of the four numbers of the IP address are insecure. Hence, any IP address including a "9" in the first of the four numbers of the IP address, e.g., 9.x.x.x, would be considered acceptable and safe, i.e., data containing sensitive information would be downloaded by the server 120 to the client machine 110 if the machine 110 has an IP address comprising 9.x.x.x. It is further contemplated that a list of unacceptable locations may be defined in terms of corresponding host names. For example, a list may indicate that any location having a corresponding host name comprising "foobar" is insecure. Hence, a client machine having a fully qualified domain name of "foobar.ibm.com," wherein the host name comprises "foobar" and the domain name comprises "ibm.com" would not receive data containing sensitive information from the server 120.

It is contemplated that two or more sets of secure locations may be defined. For example, Company A may define a first set of secure locations as corresponding to high-level security data containing high-level sensitive information, while defining a second set of secure locations as corresponding to intermediate-level security data containing intermediate-level sensitive information. Hence, a first list of acceptable IP addresses or fully qualified domain names, i.e., corresponding to acceptable locations, may defined for receiving data including high-level sensitive information and a second list of acceptable IP address or fully qualified domain names, i.e., corresponding to acceptable locations, may be defined for receiving data including intermediate-level sensitive information. A secure location falling within the first set may comprise a home of a senior officer at Company A. Secure locations falling within the second set may comprise a home of a middle manager at Company A as well as the home of the senior officer. The second list may include all IP addresses or fully qualified domain names set out on the first list.

Alternatively, an IP address or fully qualified domain name corresponding to the home of the middle manager may be found on a list of IP addresses or fully qualified domain names for hosts deemed unacceptable for receiving data containing high-level sensitive information. However, the IP addresses or fully qualified domain names corresponding to the homes of the senior officer and the middle manager may not be found on a list of unacceptable IP addresses or fully qualified domain names for receiving data including intermediate-level sensitive information.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method of determining whether predefined data controlled by a server is replicated to a client machine comprising:
    receiving, by the server, a request for said predefined data from said client machine;
    tracing, by the server, a route information packets take to reach said client machine from said server;
    determining, by the server, an acceptability of a location of said client machine to receive said predefined data using said traced route;
    replicating, by the server, said requested predefined data to said client machine when said location of said client machine is determined to be acceptable and preventing, by the server, replication of said predefined data to said client machine when said location of said client machine is determined to be unacceptable; and
    storing, by the server, a list identifying each trusted host capable of being located along said route between said server and said client machine, and wherein said location of said client machine is determined to be acceptable when all hosts along said route are found on said list.

2. The method of claim 1, wherein said predefined data comprises one of high-level security data and intermediate-level security data and said determining said acceptability of said location comprises defining a first set of acceptable locations corresponding to said high-level security data and a second set of acceptable locations corresponding to said intermediate-level security data.

3. The method of claim 1, wherein said location of said client machine is further determined to be acceptable when a number of hosts along said route between said server and said client machine is less than a predefined number.

4. The method of claim 1, further comprising storing a list identifying each insecure host capable of being located along said route between said server and said client machine, and wherein said location of said client machine is further determined to be acceptable when none of the hosts along said route is found on said list.

5. A system for determining whether predefined data is replicated to a client machine comprising:
    a module to receive a request for said predefined data from said client machine;
    a module to trace a route information packets take to reach said client machine from said system;
    a module to store a list containing each trusted host capable of being located along said route between said system and said client machine;
    a module to determine an acceptability of a location of said client machine to receive said predefined data using said traced route, wherein said location of said client machine is determined to be acceptable when all hosts along said route are found on said list; and
    a module to replicate said requested predefined data to said client machine when said location of said client machine is determined to be acceptable and prevent replication of said predefined data to said client machine when said location of said client machine is determined to be unacceptable.

6. The system of claim 5, wherein said predefined data comprises one of high-level security data and intermediate-level security data and said module to determine said acceptability of said location defines a first set of acceptable locations corresponding to said high-level security data and a second set of acceptable locations corresponding to said intermediate-level security data.

7. The system of claim 5, wherein said module to determine said acceptability of said location further determines when a number of hosts along said route between said system and said client machine is less than a predefined number.

8. The system of claim 5, further comprising a module to store a list containing each insecure host capable of being located along said route between said system and said client machine, and wherein said module to determine said acceptability of said location further determines that said location of said client machine is acceptable when none of the hosts along said route is found on said list.

9. A computer program product for determining whether predefined data is replicated to a client machine, the computer program product comprising:
    a computer readable storage medium having computer usable program code embodied therewith, the computer usable program code comprising:
        computer usable program code configured to receive a request for said predefined data from said client machine;

computer usable program code configured to trace a route information packets take to reach said client machine from a server;

computer usable program code configured to store a list containing each trusted host capable of being located along said route between said server and said client machine;

computer usable program code configured to determine an acceptability of a location of said client machine to receive said predefined data using said traced route, wherein said location of said client machine is determined to be acceptable when all hosts along said route are found on said list; and computer usable program code configured to replicate said requested predefined data to said client machine when said location of said client machine is determined to be acceptable and prevent replication of said predefined data to said client machine when said location of said client machine is determined to be unacceptable.

10. The computer program product of claim 9, wherein said computer usable program code to determine said acceptability of said location further determines when a number of hosts along said route between said server and said client machine is less than a predefined number.

11. The computer program product of claim 9, further comprising computer usable program code to store a list containing each insecure host capable of being located along said route between said server and said client machine, and wherein said computer usable program code to determine said acceptability of said location further determines that said location of said client machine is acceptable when none of the hosts along said route is found on said list.

* * * * *